United States Patent
Schelstraete et al.

(10) Patent No.: US 11,271,780 B2
(45) Date of Patent: Mar. 8, 2022

(54) RECEIVED SIGNAL EQUALIZATION OF WIRELESS TRANSMISSIONS

(71) Applicant: SEMICONDUCTOR COMPONENTS INDUSTRIES, LLC, Phoenix, AZ (US)

(72) Inventors: Sigurd Schelstraete, Menlo Park, CA (US); Hossein Dehghan, Diablo, CA (US); Imran Latif, Fremont, CA (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 17/017,191

(22) Filed: Sep. 10, 2020

(65) Prior Publication Data

US 2022/0006673 A1 Jan. 6, 2022

Related U.S. Application Data

(60) Provisional application No. 63/047,002, filed on Jul. 1, 2020.

(51) Int. Cl.
*H04L 25/02* (2006.01)
*H04L 1/18* (2006.01)
*H04L 25/03* (2006.01)

(52) U.S. Cl.
CPC ........ *H04L 25/0212* (2013.01); *H04L 1/1812* (2013.01); *H04L 25/024* (2013.01); *H04L 25/03057* (2013.01); *H04L 25/03343* (2013.01); *H04L 2025/03433* (2013.01)

(58) Field of Classification Search
CPC .......... H04L 25/0212; H04L 25/03057; H04L 25/03343; H04L 1/1812; H04L 25/024; H04L 2025/03433
See application file for complete search history.

(56) References Cited

U.S. PATENT DOCUMENTS

| | | | |
|---|---|---|---|
| 2011/0044409 A1* | 2/2011 | Yoshimoto | H04J 11/004 375/340 |
| 2011/0173508 A1* | 7/2011 | Wehinger | H04L 25/03292 714/748 |
| 2014/0269881 A1 | 9/2014 | He et al. | |
| 2015/0078494 A1 | 3/2015 | Talvitie et al. | |
| 2015/0131760 A1* | 5/2015 | White | H04J 11/004 375/340 |
| 2020/0015111 A1* | 1/2020 | Martinez | H04L 47/12 |

* cited by examiner

*Primary Examiner* — Dac V Ha
(74) *Attorney, Agent, or Firm* — Maschoff Brennan; Jason W. Croft

(57) ABSTRACT

Example operations may include obtaining a first received signal of a first wireless transmission by a transmitting device of a wireless signal received at a receiving device. The operations may also include obtaining a second received signal of a second wireless transmission by the transmitting device that is a retransmission of the wireless signal also received at the receiving device. The operations may further include determining, based on the first received signal and the second received signal, an equalization of distortion of propagation of the wireless signal between the transmitting device and the receiving device. In addition, the operations may include generating an equalized signal based on the determined signal equalization, wherein the equalized signal is an estimate of the wireless signal as transmitted by the transmitting device.

20 Claims, 5 Drawing Sheets

RECEIVED SIGNAL EQUALIZATION OF WIRELESS TRANSMISSIONS

CROSS-REFERENCE TO RELATED APPLICATION

This application claims the benefit of U.S. Provisional Patent Application No. 63/047,002, filed on Jul. 1, 2020, the entire contents of which is incorporated herein by reference.

FIELD

The implementations discussed in the present disclosure relate to equalization of received signals of wireless transmissions.

BACKGROUND

Unless otherwise indicated in the present disclosure, the materials described in the present disclosure are not prior art to the claims in the present application and are not admitted as being prior art by inclusion in this background section.

As wireless signals propagate from a transmitting device to a receiving device, one or more characteristics of the carrier wave of the wireless signals may change due to conditions of the propagation path from the transmitting device to the receiving device. For example, distance, objects, weather, atmospheric conditions, etc. of the propagation path may cause changes in the carrier wave such as changes in the amplitude, phase shifts, frequencies, etc. of the carrier wave. Therefore, the propagation path of the wireless signals may distort the wireless signals as the wireless signals propagate from a respective transmitting device to a respective receiving device.

The subject matter claimed in the present disclosure is not limited to implementations that solve any disadvantages or that operate only in environments such as those described above. Rather, this background is only provided to illustrate one example technology area where some implementations described in the present disclosure may be practiced.

SUMMARY

Example operations may include obtaining a first received signal of a first wireless transmission by a transmitting device of a wireless signal received at a receiving device. The operations may also include obtaining a second received signal of a second wireless transmission by the transmitting device that is a retransmission of the wireless signal also received at the receiving device. The operations may further include determining, based on the first received signal and the second received signal, an equalization of distortion of propagation of the wireless signal between the transmitting device and the receiving device. In addition, the operations may include generating an equalized signal based on the determined signal equalization, wherein the equalized signal is an estimate of the wireless signal as transmitted by the transmitting device.

BRIEF DESCRIPTION OF THE DRAWINGS

Example implementations will be described and explained with additional specificity and detail using the accompanying drawings in which.

DETAILED DESCRIPTION

Figure 1:
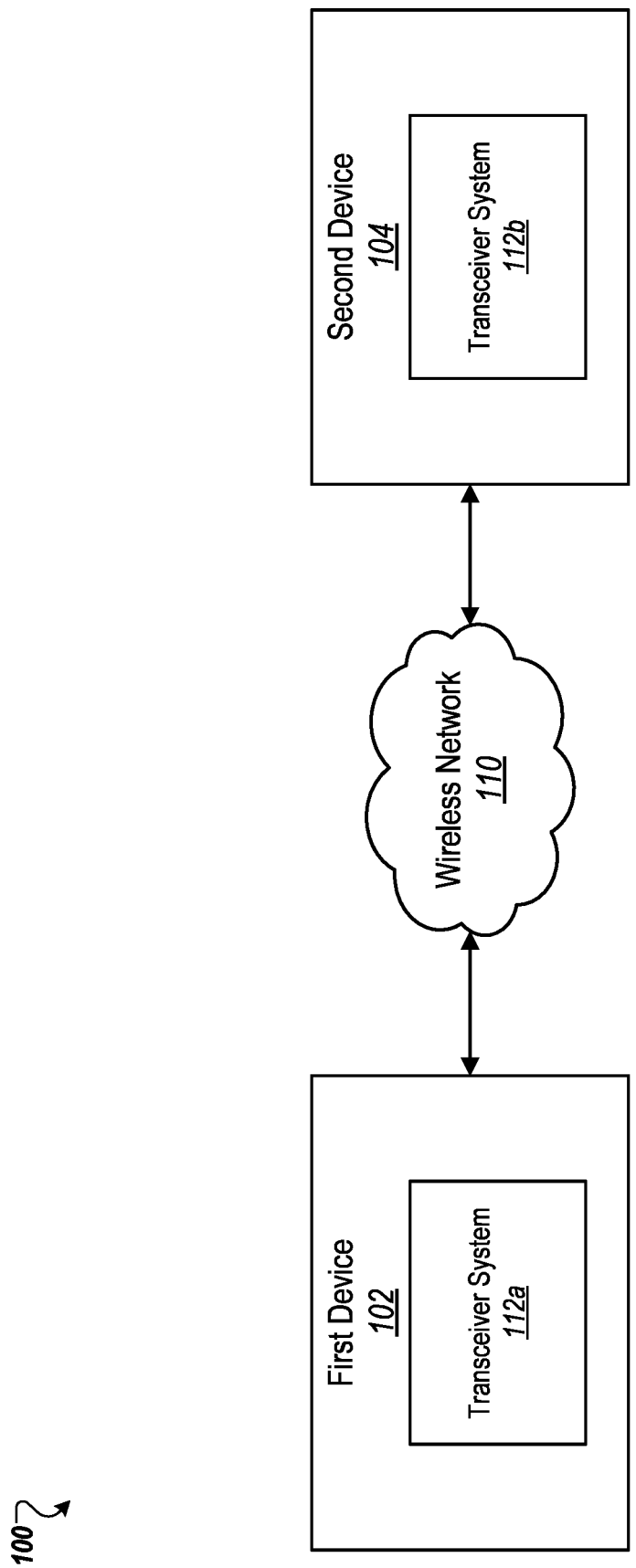
FIG. 1 illustrates an example environment related to equalization of received signals of wireless transmissions.

Implementations described herein may generally include systems and methods related to equalization of received signals of wireless transmissions. The equalization may include adjusting the received signals to help offset distortion of the wireless signal that may occur during propagation of the wireless signals between respective transmitting devices and respective receiving devices of the wireless signals.

Additionally, wireless communication protocols may be such that after equalization a receiving device may detect errors in the received signals. In response to the error detection indicating that the received signal does not satisfy a particular quality threshold, the receiving device may request that the transmitting device retransmit the wireless signal. For example, wireless communication protocols may include an automatic repeat request (ARQ) and/or hybrid ARQ (HARQ) protocol in which the receiving device may perform a cyclic redundancy check (CRC) on redundant bits that are added to the data of the received signal. Based on the CRC, the receiving device may determine that the received signal is corrupted to a degree that at least some of the data of the received signal may not be identified or reproduced. In response to such a determination, the receiving device may request that the transmitting device retransmit the wireless signal. In the present disclosure, reference to retransmission of a wireless signal may include transmitting another carrier wave at substantially the same frequency and having substantially the same data modulated thereon in substantially the same way as the previously transmitted wireless signal. As such, the previously transmitted wireless signal and the retransmitted wireless signal, as transmitted by the transmitting device, may be two separate wireless signals but with substantially the same characteristics.

According to one or more implementations described in the present disclosure, an equalized signal may be generated based on a received signal of a wireless transmission of a wireless signal and based on one or more additional received signals of one or more respective additional wireless transmissions that may each be retransmissions of the wireless signal. By comparison typical equalization operations may generate an equalized signal based on only a currently received signal instead of being based on multiple received signals. As discussed in detail below, the use of multiple received signals to generate the equalized signal may be such that the equalized signal may better resemble the wireless signal as transmitted by the transmitting device than in instances in which only a currently received signal may be used.

These and other implementations of the present disclosure will be explained with reference to the accompanying figures. It is to be understood that the figures are diagrammatic and schematic representations of such example implementations, and are not limiting, nor are they necessarily drawn to scale. In the figures, features with like numbers indicate like structure and function unless described otherwise.

FIG. 1 illustrates an example environment 100 configured to facilitate equalization of received signals of wireless transmissions. The environment 100 may be configured according to one or more implementations of the present disclosure. The environment 100 may include one or more of many different types of environments. For example, the environment 100 may include, individually or any suitable combination thereof, a home environment, an IoT environment, a vehicle environment, or any other suitable environment that may include or incorporate a wireless network to facilitate the communication of data between devices. In the present example, the environment 100 may include a first device 102 and a second device 104, which may be configured to wirelessly communicate with each other via a wireless network 110. The elements listed and operations thereof are not meant to be limiting, but merely used to provide an example implementation of the present disclosure.

The wireless network 110 may include any suitable network that may be established to wirelessly communicate data between devices. For example, the wireless network 110 may include a wireless local area network (LAN) and/or a wireless telecommunications network. In some implementations, the wireless network 110 may be communicatively coupled to or included in another network such as a wide area network (WAN) (e.g., the Internet) and/or any other suitable interconnected data paths across which multiple devices may communicate.

Each of the first device 102 and the second device 104 (referred to collectively or generally as "the devices") may include any suitable system or device configured to perform wireless communications. For example, one or more of first device 102 and the second device 104 may operate as an access point of the wireless network 110. An access point of the wireless network 110 may include any suitable system or device that may establish the wireless network 110 and/or communicatively couple the wireless network 110 with another network. By way of the example, the access point(s) may include a gateway, a repeater, a mesh node, and/or other suitable access point that wirelessly couples the other devices of the wireless network 110 to each other and/or to another network (e.g., the Internet and/or a core network via a bridge, a backhaul link, a base station, and/or other suitable devices or connections).

Additionally or alternatively, one or more of first device 102 and the second device 104 may operate as a node of the wireless network 110. For example, a node of the wireless network 110 may generally include any device that has the capability to wirelessly connect to an access point of the wireless network 110 according to any suitable wireless standard of the wireless network 110 (e.g., the 802.11 standards). By way of example, the node(s) may include a desktop computer, a laptop computer, a tablet computer, a mobile phone, a smartphone, a personal digital assistant (PDA), a smart television, or any other suitable device. In some implementations, each of the first device 102 and the second device 104 may include or be included in a computing system such as the computing system 402 described with respect to FIG. 4.

The first device 102 may include a first transceiver system 112a and the second device 104 may include a second transceiver system 112b (referred to collectively or generally as the "transceiver systems 112"). The transceiver systems 112 may include any suitable, system, apparatus, or device that may be configured to effectuate the transmission and reception of wireless signals.

For example, one or more of the transceiver systems 112 may include an antenna configured to receive wireless signals (e.g., modulated electromagnetic waves) and configured to convert the received wireless signals into corresponding analog electrical signals (referred to as "received analog signals"). The one or more transceiver systems 112 may include one or more analog components configured to perform any applicable analog operations on the received analog signals. In these or other implementations, the one or more transceiver systems 112 may include an analog-to-digital converter (ADC) configured to convert the received analog signals into corresponding digital signals (referred to as "received digital signals"). In the present disclosure reference to a "received signal" may include a received wireless signal, a received analog signal, a received digital signal, or any combination thereof. For example, the term "received signal" may be generically used to refer to a received wireless signal that is converted into a received analog signal that may then be converted into a received digital signal.

The transceiver systems 112 may include receiver digital circuitry configured to process the received digital signals and corresponding data of the received digital signals. Additionally or alternatively, the receiver digital circuitry may be configured to direct operations related to the reception and processing of wireless signals. One or more elements of the receiver digital circuitry may be hardware that is custom designed to perform one or more of the receiver operations. Additionally or alternatively, one or more of the elements of the receiver digital circuitry may include a computing system that is programmed to perform certain operations using computer-executable instructions. For example, one or more elements of the computing system 402 of FIG. 4 may be included in or part of the receiver digital circuitry in some implementations.

In these or other implementations, one or more of the transceiver systems 112 may include transmitter digital circuitry configured to generate digital signals for wireless transmission referred to as "transmission digital signals." In some implementations, the receiver digital circuitry and the transmitter digital circuitry may be completely separate. Additionally or alternatively, the receiver digital circuitry and the transmitter digital circuitry may include one or more of the same hardware components. For example, in some implementations, the same computing system may be used as part of the transmitter digital circuitry and the receiver digital circuitry.

The one or more transceiver systems 112 may include a digital-to-analog converter (DAC) configured to convert the transmission digital signals into corresponding transmission analog signals. The transmission of analog signals may be directed toward an antenna (e.g., the same antenna used to receive wireless signals or a different antenna), which may convert the transmission analog signals into wireless signals in the form of electromagnetic waves having data modulated thereon. In some implementations the one or more transceiver systems 112 may include one or more analog components configured to perform any applicable analog operations on the transmission analog signals prior to directing the transmission analog signals to the antenna. Further, in the present disclosure reference to "hardware" performing operations may include one or more of the elements of the devices (e.g., of the transceiver systems 112 performing operations). In addition, reference to "hardware" performing operations may include operations that are performed as directed by software in the form of computer-executable instructions.

The transceiver systems 112 may be configured to perform one or more operations related to retransmission of wireless signals, according to one or more implementations of the present disclosure. For example, the first device 102 may transmit, using the first transceiver system 112a, a first wireless transmission of a wireless signal to the second device 104 over the wireless network 110. As such, in this particular example, the first device 102 may operate as a transmitting device and the second device 104 may operate as a receiving device. In other instances, the first device 102 may operate as a receiving device. Additionally or alternatively, the second device 104 may operate as a transmitting device.

The second device 104 may receive, e.g., using the second transceiver system 112b, the wireless signal of the first transmission as a received signal. The second transceiver system 112b may be configured to perform an error detection analysis of the received signal to determine whether the received signal satisfies a particular quality threshold. In response to the error detection analysis indicating that the received signal does not satisfy the particular quality threshold, the second device 104 may be configured to request that the first device 102 perform a second wireless transmission that is a retransmission of the wireless signal of the first wireless transmission. In response to the request by the second device 104, the first device 102 may retransmit the wireless signal in the second wireless transmission. The second device 104 may receive the retransmitted wireless signal as a second received signal.

In some implementations, the receiver digital circuitry of the second transceiver system 112b may be configured to perform the error detection after decoding the received signal. Further, the receiver digital circuitry may be configured to determine to request the second wireless transmission. In one or more implementations, the retransmission of the wireless signal and the processing of the retransmitted wireless signal may be performed according to any suitable protocol such as an ARQ and/or HARQ protocol.

According to one or more implementations, the second device 104 may be configured to perform one or more equalization operations based on the first received signal and the second received signal. The equalization may include one or more operations to compensate for the distortion caused by propagation of the wireless signal from the first device 102 to the second device 104. For example, one or more characteristics of the carrier wave of the wireless signal (as transmitted and retransmitted) may change due to conditions of the propagation path. Therefore, the wireless signal may be distorted as the wireless signal propagates from the first device 102 to the second device 104 such that the first received signal and/or the second received signal may have one or more characteristics that are different from the wireless signal as transmitted by the first device 102. As such, the equalization may be performed to generate an equalized signal that helps compensate for the distortion such that the equalized signal may be an estimate of the wireless signal as transmitted by the first device 102.

For example, as discussed in further detail below, the second device 104 may be configured to determine a channel estimate with respect to the distortion of the propagation path between the transmitting device and the receiving device. The determined channel estimate may indicate the type of distortion that may be experienced by the wireless signal. As such, the channel estimate may be used to determine which equalization operations may be performed to help offset the distortion. For example, the channel estimate may indicate a positive phase shift of 20 degrees of the wireless signal during propagation. As such, an equalization operation may include applying a negative phase shift of 20 degrees to a corresponding received signal to offset the phase shift that occurs during propagation.

In some implementations, the second device 104 may be configured to determine the channel estimate using the first received signal and the second received signal. Examples of using channel estimates from multiple received signals and performing equalization accordingly are described in further detail below with respect to FIGS. 2 and 3.

As another example, in some implementations, the second device 104 may be configured to determine a channel estimate based on the first received signal and/or the second received signal and may determine a preliminary equalization based on the determined channel estimate. Additionally or alternatively, the second device 104 may be configured to determine error correction information associated with the first received signal based on data decoded from the first received signal. In these or other implementations, the second device 104 may be configured to determine an enhanced equalization based on the determined error correction information. Additionally, the second device 104 may be configured to perform the preliminary equalization with respect to the second received signal (or a combination of the second received signal and the first received signal such as described in further detail below) to generate a preliminary equalized signal. The second device 104 may then be configured to modify the preliminary equalized signal based on the enhanced equalization to generate the equalized signal. One or more examples of performing equalization in this manner are described in further detail below with respect to FIG. 4.

Performing operations related to equalization (e.g., channel estimation, signal adjustment, etc.) based on multiple received signals related to wireless signal retransmission may improve the accuracy of the equalization as opposed to performing such operations based on only one received signal. Further, performing the equalization in the manner described in the present disclosure may reduce the number of signal retransmissions that may be performed for the obtaining and decoding of the data of the wireless signals. For example, improved equalization may improve the quality of the equalized signals that are being decoded. The improved quality may allow for better extraction of the data modulated thereon, which may reduce the number of retransmission requests.

In other examples, the environment 100 may include more devices that are communicatively coupled to the wireless network 110. Additionally or alternatively, as indicated above, although the first device 102 operates as a transmitting device in the example given with respect to equalization, the first device 102 may be configured to perform the equalization described in the present disclosure in instances in which the first device 102 may operate as a receiving device. Further, the second device 104 may be configured to operate as a transmitting device and is not limited to operating as a receiving device. Further, the first device 102 and the second device 104 may be configured to perform any number of other operations than those explicitly described.

Figure 2:
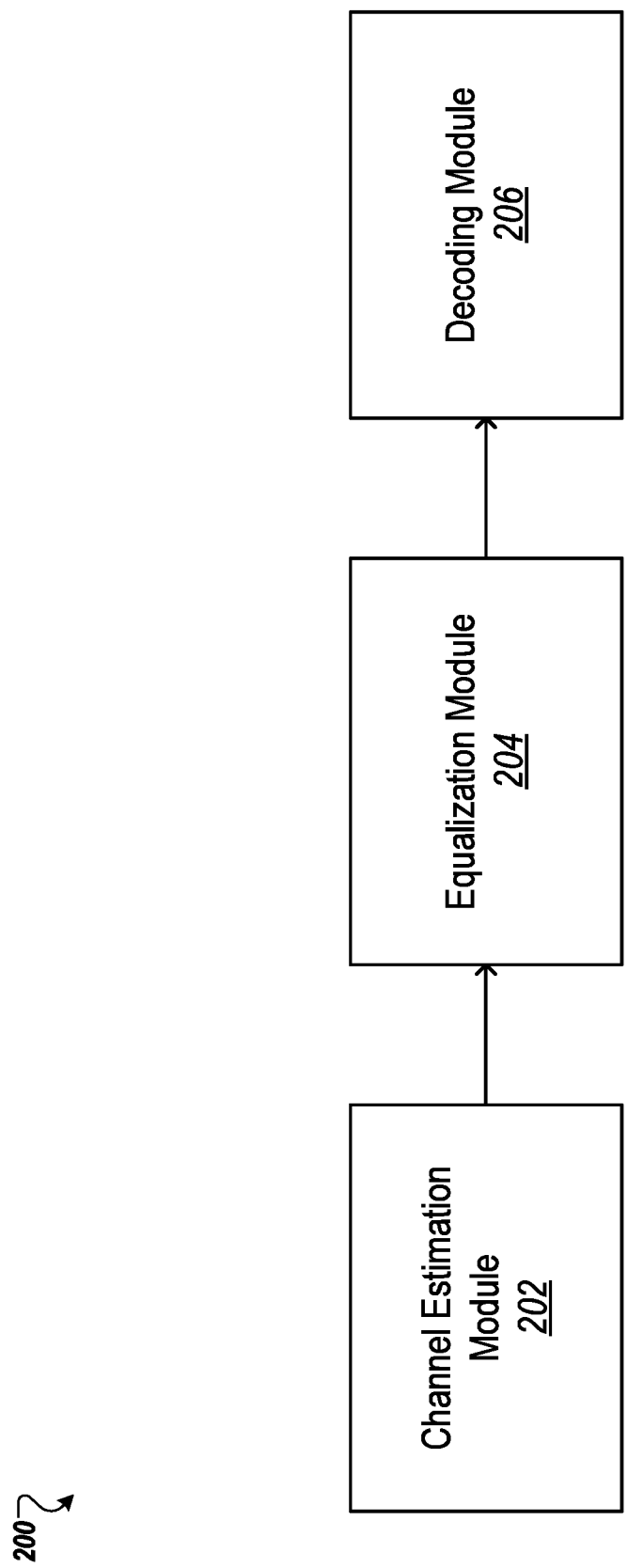
FIG. 2 illustrates an example signal processing system configured to process received signals.

FIG. 2 illustrates an example signal processing system 200 ("system 200") configured to process received signals, according to one or more implementations of the present disclosure. The system 200 may be part of a receiver portion of a transceiver system of a device. For example, the system 200 may be included in the first transceiver system 112a of the first device 102 and/or in the second transceiver system 112b of the second device 104 of FIG. 1. Additionally or alternatively, the system 200 may be included in digital circuitry of the corresponding transceiver system. Moreover, the system 200 may be included in or implemented as a computing system, such as the computing system 402 described below with respect to FIG. 4.

The system 200 may include a channel estimation module 202 ("channel module 202"). The channel module 202 may be configured to perform channel estimation based on a first received signal and a second received signal, which may be received by a receiving device.

For example, the channel module 202 may be configured to obtain the first received signal, which may correspond to a first wireless transmission of a wireless signal by a transmitting device. In some implementations, the channel module 202 may be configured to determine a first channel estimate based on the first received signal. The first channel estimate may indicate conditions of the propagation path between the transmitting device and the receiving device that may distort the wireless signal during the first wireless transmission. In some implementations, the channel module 202 may be configured to determine the first channel estimate based on a first training signal of the first received signal according to any appropriate technique.

For example, the first training signal may correspond to a sequence of data that may be inserted in the wireless signal as transmitted by the transmitting device and that may be known by the channel module 202. Based on a comparison between the first training signal as included in the first received signal and the known sequence of data, the channel module 202 may be configured to determine, using any suitable technique, the first channel estimate with respect to the propagation path of the wireless signal during the first wireless transmission.

The channel module 202 may be configured to store the determined first channel estimate (e.g., as a first channel matrix) in some implementations. For example, the determined first channel estimate may be stored in RAM or a register such that it may be available for use or retrieval at a later time.

Additionally, the channel module 202 may be configured to obtain the second received signal, which may correspond to a second wireless transmission that is a retransmission of the wireless signal transmitted during the first wireless transmission. In some implementations, the channel module 202 may be configured to determine a second channel estimate based on the second received signal. The second channel estimate may indicate conditions of the propagation path between the transmitting device and the receiving device that may distort the retransmitted wireless signal during the second wireless transmission. In some implementations, the channel module 202 may be configured to determine the second channel estimate based on a second training signal of the second received signal, which may be analogous to the first training signal of the first received signal.

The channel module 202 may be configured to store the determined second channel estimate (e.g., as a second channel matrix) in some implementations. For example, the determined second channel estimate may be stored in RAM or a register such that it may be available for use or retrieval at a later time.

In some implementations, the channel module 202 may be configured to determine, a mixed channel estimate based on the first channel estimate and the second channel estimate. For example, the channel module 202 may be configured to mix the first channel estimate and the second channel estimate by averaging the first channel estimate and the second channel estimate to determine, as the mixed channel estimate, an averaged channel estimate. For instance, the first channel estimate may be represented by a first channel matrix and the second channel estimate may be represented by a second channel matrix. The channel module 202 may be configured to determine the averaged channel estimate by generating an averaged channel matrix that is an average of the first channel matrix and the second channel matrix. The average channel estimate may provide a more accurate estimate of the channel conditions than the first channel estimate or the second channel estimate alone. For example, the average channel estimate may average out noise of the channel estimation.

In these or other implementations, the stored first channel estimate and/or the stored second channel estimate may be retrieved for determining the mixed channel estimate. In these or other implementations, the channel module 202 may be configured to store the determined mixed channel estimate in some implementations. For example, the determined mixed channel estimate may be stored in RAM or a register such that it may be available for use or retrieval at a later time.

In some implementations, the channel module 202 may be configured to determine whether to use the first channel estimate and the second channel estimate to determine the average channel estimate based on a correlation between the first channel estimate and the second channel estimate. For example, a comparison may be made between the first channel estimate and the second channel estimate to determine a degree of similarity between the first channel estimate and the second channel estimate.

In response to the correlation (e.g., the determined degree of similarity) between the first channel estimate and the second channel estimate being within a particular threshold, the average channel estimate may be determined based on the first channel estimate and the second channel estimate. In response to the correlation not being within the particular threshold, the average channel estimate may not be determined. Additionally or alternatively, in response to the correlation not being within the particular threshold, the average channel estimate may be determined using one of the first channel estimate or the second channel estimate and another channel estimate (e.g., determined based on a third received signal) with a correlation that is within the particular threshold of the one of the first channel estimate or the second channel estimate.

In some implementations, the channel module 202 may be configured to determine the averaged channel estimate based on an average of the first training signal and the second training signal in addition or alternatively to determining the averaged channel estimate based on an average of the first channel estimate and the second channel estimate. For example, the channel module 202 may be configured to average the first training signal of the first received signal and the second training signal of the second received signal to generate an averaged training signal. For instance, a first training signal vector may represent the first training signal and a second training signal vector may represent the second training signal. In some implementations, the channel module 202 may be configured to generate an averaged training signal vector by averaging the first training signal vector with the second training signal vector. The averaged training signal vector may represent the averaged training signal. The channel module 202 may additionally be configured to determine the averaged channel estimate by using the averaged training signal to determine a channel estimate with respect to propagation of the wireless signal from the transmitting device to the receiving device.

The channel module 202 may be configured to store the first training signal (e.g., as a first signal vector) and/or the second training signal (e.g., as a second signal vector). For example, the first training signal and/or the second training signal may be stored in RAM or a register such that the first training signal and the second training signal may be available for use or retrieval at a later time, such as for determining the averaged training signal for determining the averaged channel estimate.

In some implementations, the channel module 202 may be configured to determine whether to use the first training signal and the second training signal to determine the average training signal based on a correlation between the first training signal and the second training signal, such as described above with respect determining whether to average the first channel estimate and the second channel estimate.

In some implementations, the channel module 202 may be configured to operate as if the first received signal and the second received signal were received at the same time by multiple antennas. For example, the channel module 202 may be configured to determine the first channel estimate and the second channel estimate, such as described above. In these or other implementations, the channel module 202 may be configured to combine the first channel estimate and the second channel estimate as if the first received signal and the second received signal were received at the same time by multiple antennas. For example, the channel module 202 may be configured to concatenate the first channel matrix that corresponds to the first channel estimate with the second channel matrix that corresponds to the second channel estimate to generate a combined channel matrix that includes the values of the first channel matrix and the second channel matrix. The combined channel matrix may represent a combined channel estimate, which may be an example of the mixed channel estimate.

An equalization module 204 of the system 200 may be configured to obtain the determined mixed channel estimate (e.g., the determined average channel estimate or the combined channel estimate) that is determined by the channel module 202. The equalization module 204 may be configured to perform equalization to generate an equalized signal based on the mixed channel estimate that may be received from the channel module 202. The equalization module 204 may perform the equalization using any suitable technique that may generate an equalized signal based on the mixed channel estimate. For example, the equalization module 204 may be configured to generate a received signal vector based on a channel matrix that corresponds to the mixed channel estimate and based on one or more signal vectors that represent one or more of the first received signal and the second received signal.

For example, in instances in which the mixed channel estimate is an averaged channel estimate that is based on an averaging of the first channel estimate and the second channel estimate or is based on an averaging of the first training signal and the second training signal, the equalization module 204 may be configured to perform one or more equalization operations with respect to the second received signal using the averaged channel estimate to generate an equalized signal. Additionally or alternatively, the equalization module 204 may be configured to perform one or more equalization operations with respect to the first received signal using the averaged channel estimate to generate the equalized signal.

In these or other implementations, the equalization module 204 may be configured to average the first received signal and the second received signal to generate an averaged received signal. For example, the first received signal may be represented as a first signal vector and the second received signal may be represented as a second signal vector. The equalization module 204 may be configured to generate an averaged signal vector by averaging the first signal vector and the second signal vector. The averaged signal vector may represent the averaged received signal. In these or other implementations, the equalization module 204 may be configured to generate the equalized signal by performing the equalization with respect to the averaged received signal using the averaged channel estimate.

Additionally or alternatively, the equalization module 204 may be configured to generate the equalized signal by performing the equalization with respect to the averaged received signal using the first channel estimate, which may be received from the channel module 202 in some implementations. In these or other implementations, the equalization module 204 may be configured to generate the equalized signal by performing the equalization with respect to the averaged received signal using the second channel estimate, which may be received from the channel module 202 in some implementations.

As indicated above, in some implementations the mixed channel estimate may be a combined channel estimate that is a combination of the first channel estimate and the second channel estimate as if the first received signal and the second received signal were received at the same time but by different antennas. In such implementations, the equalization module 204 may be configured to combine the first received signal and the second received signal to generate a combined received signal that is a combination of the first received signal and the second received signal as if the first received signal and the second received signal were received at the same time but by different antennas.

For example, the equalization module 204 may be configured to concatenate the first signal vector of the first received signal with the second signal vector of the second received signal to generate a combined signal vector that includes the values of the first signal vector and the second signal vector. The combined signal vector may represent the combined received signal. In these or other implementations, the equalization module 204 may be configured to perform the equalization with respect to the combined received signal using the combined channel estimate to generate the equalized signal. For instance, the equalization module 204 may be configured to perform the equalization with respect to the combined signal vector that is a concatenation of the first signal vector and the second signal vector and with respect to the combined channel matrix that is a concatenation of the first channel matrix and the second channel matrix to generate an equalized signal vector.

A decoding module 206 of the system 200 may be configured to obtain the equalized signal generated by the equalization module 204. The decoding module 206 may be configured to perform one or more decoding operations to extract the data from the equalized signal. The decoding module 206 may perform the decoding using any suitable technique.

Figure 3:
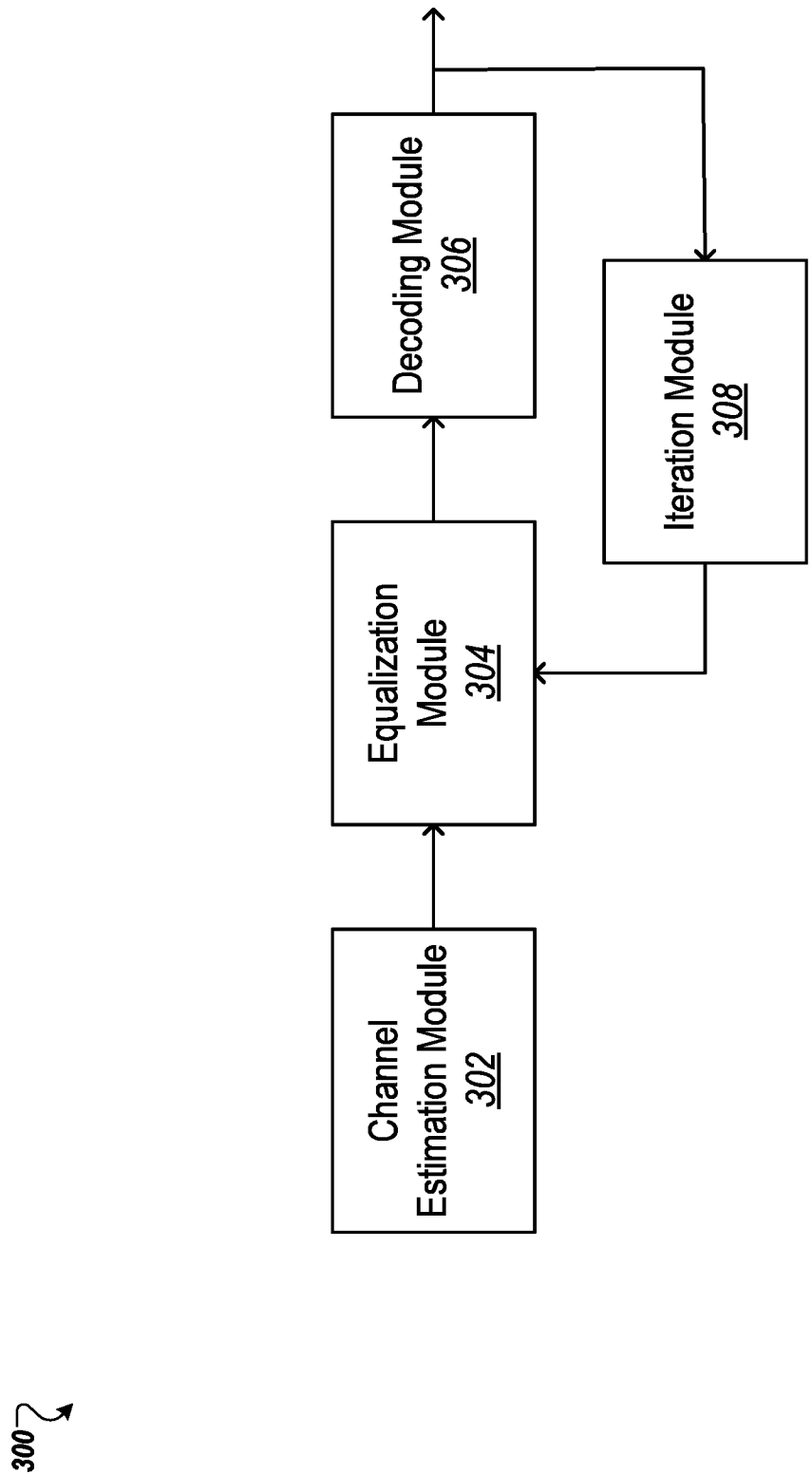
FIG. 3 illustrates another example signal processing system configured to process received signals.

FIG. 3 illustrates another example signal processing system 300 ("system 300") configured to process received signals, according to one or more implementations of the present disclosure. The system 300 may be part of a receiver portion of a transceiver system of a device. For example, the system 300 may be included in the first transceiver system 112*a* of the first device 102 and/or in the second transceiver system 112*b* of the second device 104 of FIG. 1. Additionally or alternatively, the system 300 may be included in digital circuitry of the corresponding transceiver system. Moreover, the system 300 may be included in or implemented as a computing system, such as the computing system 402 described below with respect to FIG. 4.

The system 300 may include a channel estimation module 302 ("channel module 202"). The channel module 302 may be configured to perform channel estimation with respect to received signals and the resulting channel estimates may be obtained by an equalization module 304 of the system 300. For example, the channel module 302 may be configured to determine a first channel estimate with respect to a first received signal that may be from a first wireless transmission of a wireless signal. The channel module 302 may be configured to provide the first channel estimate to the equalization module 304. In these or other implementations, the channel module 302 may be configured to generate a second channel estimate with respect to a second received signal that may be from a second wireless transmission that is a retransmission of the wireless signal. The channel module 302 may provide the second channel estimate to the equalization module 304. In these or other implementations, the channel module 302 may be configured to generate an average channel estimate, such as described above with respect to FIG. 2. The channel module 302 may be configured to determine the channel estimates according to any suitable technique.

The equalization module 304 may be configured to generate a first equalized signal based on the first received signal and the first channel estimate, using any suitable technique. The equalization module 304 may be configured to provide the first equalized signal to a decoding module 306, which may be analogous to the decoding module 206 of FIG. 2.

The decoding module 306 may be configured to output first signal data that may include the data of the first received signal. In some implementations, the first signal data may include a first copy of the output symbols of the wireless signal. In these or other implementations, the first signal data may include a first copy of the bits associated with the symbols of the wireless signal. During the decoding, the decoding module 306 may be configured to perform one or more error decoding operations that may improve the reliability of the first signal data even though the corresponding data prior to the decoding may not be error free. As discussed in further detail, the improved reliability of the first signal data may be such that the first signal data may be used to improve equalization. In these or other implementations, an iteration module 308 may obtain the first signal data.

The iteration module 308 may be configured to determine error correction information from the first signal data. For example, the decoded first signal data may be translated to constellation points that are associated with the first received signal. Based on the translation, a modified estimate with respect to the first equalized signal may be determined as the error correction information. For example, the iteration module 308 may be configured to translate knowledge from the bits of the first signal data into a modified estimate of the symbols of the first equalized signal. As indicated below, the error correction information may be used to improve equalization of the second received signal.

The equalization module 304 may be configured to perform equalization with respect to the second received signal based on a corresponding channel estimate received from the channel module 302 and based on the error correction information determined by the iteration module 308. For example, the equalization module 304 may be configured to determine and perform a preliminary equalization of the second received signal based on the received channel estimate (e.g., the second channel estimate or the averaged channel estimate) to generate a preliminary equalized signal.

The equalization module 304 may additionally be configured to determine and perform an enhanced equalization based on the error correction information and the preliminary equalized signal to generate a second equalized signal of the second received signal. For example, the equalization module 304 may be configured to apply the knowledge from the error correction information to the preliminary equalized signal to generate the second equalized signal. For example, the equalization module 304 may determine and perform the enhanced equalization with respect to the preliminary equalized signal that biases the preliminary equalized signal toward the modified estimate of the first equalized signal to generate the second equalized signal.

For instance, the equalization module 304 may be configured to compare the preliminary equalized signal against the modified estimate of the first equalized signal. In some implementations, the comparing may include comparing constellation points of the preliminary equalized signal against constellation points of the modified estimate. In some instances (e.g., in response to a degree of similarity being less than a particular threshold), the equalization module 304 may determine an enhanced equalization that biases the equalization toward the constellation points of the modified estimate. The equalization module 304 may apply the enhanced equalization to the preliminary equalization to generate the second equalized signal.

The decoding module 306 may obtain the second equalized signal and may perform decoding operations on the second equalized signal to obtain second signal data. One or more errors that were included in the first signal data may be omitted from the second signal data due to the adjustments made based on the error correction information.

Although the above examples are given with respect to performing operations with respect to a first received signal and a second received signal, the concepts described may apply to any suitable number of received signals that may correspond to transmission and retransmission of a particular wireless signal. For example, the iteration module 308 may be configured to determine a second modified estimate associated with the second equalized signal. Based on the second modified estimate, the equalization module 304 may be configured to modify a preliminary equalized signal that corresponds to a third received signal of another retransmission of the wireless signal. In addition, although the preliminary equalization and the enhanced equalization are described as being performed with respect to the second received signal, the operations may be performed with respect to any suitable combination of the first received signal and the second received signal, such as described above with respect to FIG. 2.

Figure 4:
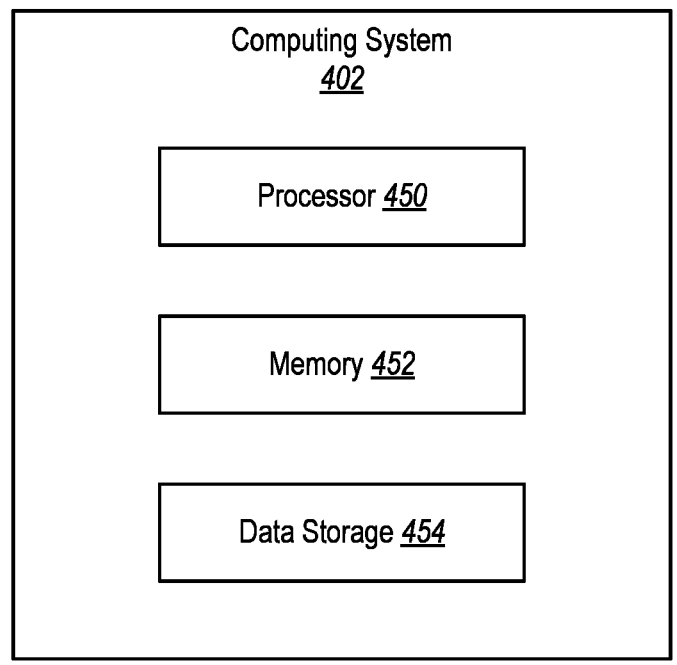
FIG. 4 illustrates a block diagram of an example computing system that may be used to perform or direct performance of one or more operations described according to at least one implementation of the present disclosure.

FIG. 4 illustrates a block diagram of an example computing system 402 that may be used to perform or direct performance of one or more operations described according to at least one implementation of the present disclosure. The computing system 402 may be included in the first device 102 and/or the second device 104 of FIG. 1 in some implementations. Additionally or alternatively, the computing system 402 may include the modules of FIGS. 2 and 3 or one or more of the modules of FIGS. 2 and 3 may be configured as the computing system 402. The computing system 402 may include a processor 450, a memory 452, and a data storage 454. The processor 450, the memory 452, and the data storage 454 may be communicatively coupled.

In general, the processor 450 may include any suitable special-purpose or general-purpose computer, computing entity, or processing device including various computer hardware or software modules and may be configured to execute instructions stored on any applicable computer-readable storage media. For example, the processor 450 may include a microprocessor, a microcontroller, a digital signal processor (DSP), an application-specific integrated circuit (ASIC), a Field-Programmable Gate Array (FPGA), or any other digital or analog circuitry configured to interpret and/or to execute computer-executable instructions and/or to process data. Although illustrated as a single processor in FIG. 4, the processor 450 may include any number of processors configured to, individually or collectively, perform or direct performance of any number of operations described in the present disclosure.

In some implementations, the processor 450 may be configured to interpret and/or execute computer-executable instructions and/or process data stored in the memory 452, the data storage 454, or the memory 452 and the data storage 454. In some implementations, the processor 450 may fetch computer-executable instructions from the data storage 454 and load the computer-executable instructions in the memory 452. After the computer-executable instructions are loaded into memory 452, the processor 450 may execute the computer-executable instructions.

The memory 452 and the data storage 454 may include computer-readable storage media for carrying or having computer-executable instructions or data structures stored thereon. Such computer-readable storage media may include any available media that may be accessed by a general-purpose or special-purpose computer, such as the processor 450. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 450 to perform a certain operation or group of operations.

Figure 5:
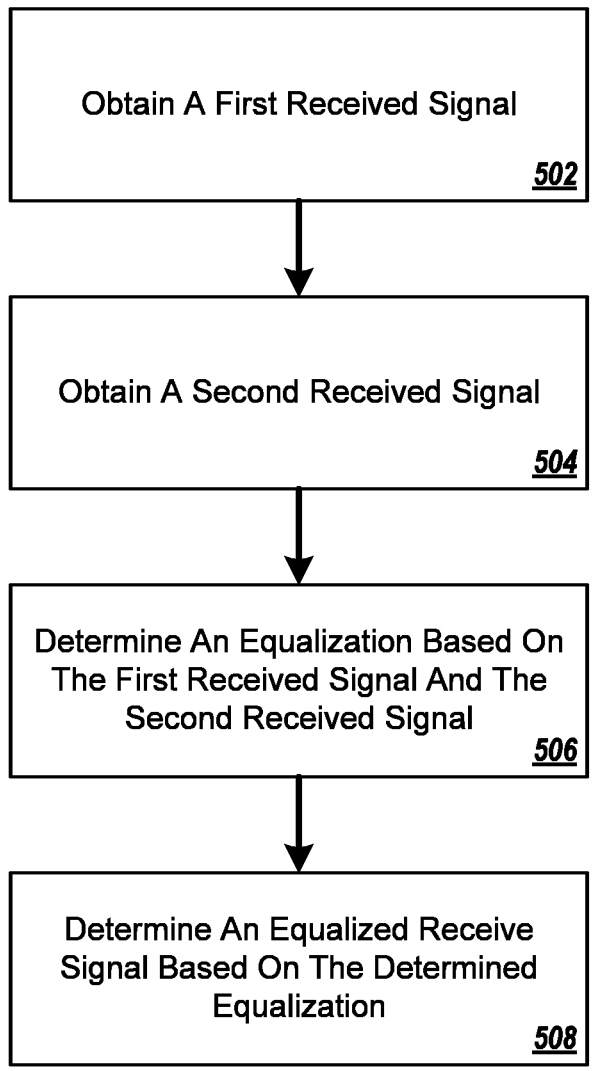
FIG. 5 is a flowchart of an example method of generating an equalized signal.

FIG. 5 is a flowchart of an example method 500 of generating an equalized signal, according to at least one implementation described in the present disclosure. The method 500 may be performed by any suitable system, apparatus, or device. For example, one or more operations of the method 500 may be performed by one or more of the devices of FIG. 1, by the system 200 of FIG. 2, by the system 300 of FIG. 3. Additionally or alternatively, one or more of the operations may be performed or directed for performance by a computing system, such as the computing system 402 of FIG. 4. Although illustrated with discrete blocks, the steps and operations associated with one or more of the blocks of the method 500 may be divided into additional blocks, combined into fewer blocks, or eliminated, depending on the particular implementation.

At block 502, a first received signal of a first wireless transmission by a transmitting device of a wireless signal and received at a receiving device may be obtained. At block 504, a second received signal of a second wireless transmission by the transmitting device of that is a retransmission of the wireless signal and that is also received at a receiving device may be obtained.

At block 506, an equalization of distortion of propagation of the wireless signal between the transmitting device and the receiving device may be determined based on the first received signal and the second received signal. The equalization may be determined according to one or more of the equalization techniques described above with respect to FIGS. 1-3.

At block 508, an equalized signal may be generated based on the determined signal equalization. The equalized signal may be an estimate of the wireless signal as transmitted by the transmitting device. The equalized signal may be generated such as described above with respect to FIGS. 1-3 in some implementations.

The subject technology of the present invention is illustrated, for example, according to various aspects described below. Various examples of aspects of the subject technology are described as numbered examples (1, 2, 3, etc.) for convenience. These are provided as examples and do not limit the subject technology. The aspects of the various implementations described herein may be omitted, substituted for aspects of other implementations, or combined with aspects of other implementations unless context dictates otherwise. For example, one or more aspects of example 1 below may be omitted, substituted for one or more aspects of another example (e.g., example 2) or examples, or combined with aspects of another example. The following is a non-limiting summary of some example implementations presented herein.

A first example method can include obtaining a first received signal of a first wireless transmission by a transmitting device of a wireless signal received at a receiving device; obtaining a second received signal of a second wireless transmission by the transmitting device that is a retransmission of the wireless signal also received at the receiving device; determining, based on the first received signal and the second received signal, an equalization of distortion of propagation of the wireless signal between the transmitting device and the receiving device; and generating an equalized signal based on the determined signal equalization. The equalized signal is an estimate of the wireless signal as transmitted by the transmitting device.

A second example method can include obtaining a first received signal of a first wireless transmission by a transmitting device of a wireless signal received at a receiving device; obtaining a second received signal of a second wireless transmission by the transmitting device that is a retransmission of the wireless signal also received at the receiving device; determining a mixed channel estimate based on the first received signal and the second received signal; determining, based on the mixed channel estimate, an equalization of distortion of propagation of the wireless signal between the transmitting device and the receiving device; and generating an equalized signal based on the determined signal equalization. The equalized signal is an estimate of the wireless signal as transmitted by the transmitting device.

A third example is of a system that can include hardware configured to perform operations, the operations including: obtaining a first received signal of a first wireless transmission by a transmitting device of a wireless signal received at a receiving device; obtaining a second received signal of a second wireless transmission by the transmitting device that is a retransmission of the wireless signal also received at the receiving device; determining a channel estimate based on one or more of the first received signal or the second received signal; determining, based on the channel estimate, an equalization of distortion of propagation of the wireless signal between the transmitting device and the receiving device; and generating an equalized signal based on the determined signal equalization. The equalized signal is an estimate of the wireless signal as transmitted by the transmitting device.

Some portions of the detailed description refer to different modules configured to perform operations. One or more of the modules may include code and routines configured to enable a computing system to perform one or more of the operations described therewith. Additionally or alternatively, one or more of the modules may be implemented using hardware including any number of processors, microprocessors (e.g., to perform or control performance of one or more operations), DSP's, FPGAs, ASICs or any suitable combination of two or more thereof. Alternatively or additionally, one or more of the modules may be implemented using a combination of hardware and software. In the present disclosure, operations described as being performed by a particular module may include operations that the particular module may direct a corresponding system (e.g., a corresponding computing system) to perform. Further, the delineating between the different modules is to facilitate explanation of concepts described in the present disclosure and is not limiting. Further, one or more of the modules may be configured to perform more, fewer, and/or different operations than those described such that the modules may be combined or delineated differently than as described.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of configured operations leading to a desired end state or result. In example implementations, the operations carried out require physical manipulations of tangible quantities for achieving a tangible result.

Unless specifically stated otherwise, as apparent from the discussion, it is appreciated that throughout the description, discussions utilizing terms such as detecting, determining, analyzing, identifying, scanning or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. Computer-executable instructions may include, for example, instructions and data which cause a general-purpose computer, special-purpose computer, or special-purpose processing device (e.g., one or more processors) to perform or control performance of a certain function or group of functions.

Although the subject matter has been described in language specific to structural features and/or methodological acts, it is to be understood that the subject matter configured in the appended claims is not necessarily limited to the specific features or acts described above. Rather, the specific features and acts described above are disclosed as example forms of implementing the claims.

An example apparatus can include a Wireless Access Point (WAP) or a station and incorporating a VLSI processor and program code to support. An example transceiver couples via an integral modem to one of a cable, fiber or digital subscriber backbone connection to the Internet to support wireless communications, e.g. IEEE 802.11 compliant communications, on a Wireless Local Area Network (WLAN). The WiFi stage includes a baseband stage, and the analog front end (AFE) and Radio Frequency (RF) stages. In the baseband portion wireless communications transmitted to or received from each user/client/station are processed. The AFE and RF portion handles the upconversion on each of transmit paths of wireless transmissions initiated in the baseband. The RF portion also handles the downconversion of the signals received on the receive paths and passes them for further processing to the baseband.

An example apparatus can be a multiple-input multiple-output (MIMO) apparatus supporting as many as N×N discrete communication streams over N antennas. In an example the MIMO apparatus signal processing units can be implemented as N×N. In various implementations, the value of N can be 4, 6, 8, 12, 16, etc. Extended MIMO operation enables the use of up to 2N antennae in communication with another similarly equipped wireless system. It should be noted that extended MIMO systems can communicate with other wireless systems even if the systems do not have the same number of antennae, but some of the antennae of one of the stations might not be utilized, reducing optimal performance.

Channel State Information (CSI) from any of the devices described herein can be extracted independent of changes related to channel state parameters and used for spatial diagnosis services of the network such as motion detection, proximity detection, and localization which can be utilized in, for example, WLAN diagnosis, home security, health care monitoring, smart home utility control, elder care, automotive tracking and monitoring, home or mobile entertainment, automotive infotainment, and the like.

Unless specific arrangements described herein are mutually exclusive with one another, the various implementations described herein can be combined in whole or in part to enhance system functionality and/or to produce complementary functions. Likewise, aspects of the implementations may be implemented in standalone arrangements. Thus, the above description has been given by way of example only and modification in detail may be made within the scope of the present invention.

With respect to the use of substantially any plural or singular terms herein, those having skill in the art can translate from the plural to the singular or from the singular to the plural as is appropriate to the context or application. The various singular/plural permutations may be expressly set forth herein for sake of clarity. A reference to an element in the singular is not intended to mean "one and only one" unless specifically stated, but rather "one or more." Moreover, nothing disclosed herein is intended to be dedicated to the public regardless of whether such disclosure is explicitly recited in the above description.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that include A alone, B alone, C alone, A and B together, A and C together, B and C together, or A, B, and C together, etc.). Also, a phrase presenting two or more alternative terms, whether in the description, claims, or drawings, should be understood to include one of the terms, either of the terms, or both terms. For example, the phrase "A or B" will be understood to include the possibilities of "A" or "B" or "A and B." This interpretation of the phrase "A or B" is still applicable even though the term "A and/or B" may be used at times to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements.

The present invention may be embodied in other specific forms without departing from its spirit or essential characteristics. The described implementations are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method comprising:
   obtaining a first received signal of a first wireless transmission by a transmitting device of a wireless signal received at a receiving device;
   obtaining a second received signal of a second wireless transmission by the transmitting device that is a retransmission of the wireless signal also received at the receiving device;
   determining, based on the first received signal and the second received signal, an equalization of distortion of propagation of the wireless signal between the transmitting device and the receiving device; and
   generating an equalized signal based on the determined signal equalization, wherein the equalized signal is an estimate of the wireless signal as transmitted by the transmitting device.

2. The method of claim 1, wherein determining the equalization based on the first received signal and the second received signal includes:
   determining a first channel estimate based on a first training signal of the first received signal;
   determining a second channel estimate based on a second training signal of the second received signal;
   determining a mixed channel estimate based on the first channel estimate and the second channel estimate; and
   determining the equalization based on the mixed channel estimate.

3. The method of claim 2, wherein determining the mixed channel estimate is in response to a correlation between the first channel estimate and the second channel estimate being within a particular threshold of each other.

4. The method of claim 2, wherein determining the mixed channel estimate includes averaging the first channel estimate and the second channel estimate.

5. The method of claim 2, wherein:
   determining the mixed channel estimate based on the first channel estimate and the second channel estimate includes combining the first channel estimate and the second channel estimate such that the mixed channel estimate is configured as if the first received signal and the second received signal were received at the same time by different antennas; and
   wherein generating the equalized signal includes:
      combining the first received signal and the second received signal to obtain a combined received signal that is configured as if the first received signal and the second received signal were received at the same time by the different antennas; and
      performing the equalization, using the mixed channel estimate, with respect to the combined received signal to generate the equalized signal.

6. The method of claim 5, wherein:
   combining the first channel estimate and the second channel estimate includes concatenating, to obtain a combined channel matrix, a first channel matrix that indicates the first channel estimate with a second channel matrix that indicates the second channel estimate;
   combining the first received signal and the second received signal includes concatenating, to obtain a combined signal vector, a first signal vector that indicates the first received signal and a second signal vector that indicates the second received signal; and
   performing the equalization includes applying the combined channel matrix to the combined signal matrix.

7. The method of claim 1, wherein determining the equalization based on the first received signal and the second received signal includes:
   determining a mixed channel estimate based on a first training signal of the first received signal and a second training signal of the second received signal; and
   determining the equalization based on the mixed channel estimate.

8. The method of claim 1, wherein:
   determining the equalization based on the first received signal and the second received signal includes:
      determining a channel estimate based on a training signal of the second received signal; and
      determining a preliminary equalization of the equalization based on the channel estimate;
      performing error decoding with respect to the first received signal to obtain first data of the wireless signal; and
      determining an enhanced equalization based on the first data; and wherein generating the equalized signal includes:
performing the preliminary equalization with respect to the second received signal to generate a preliminary equalized signal; and
modifying the preliminary equalized signal based on the enhanced equalization to generate the equalized signal.

9. A method comprising:
obtaining a first received signal of a first wireless transmission by a transmitting device of a wireless signal received at a receiving device;
obtaining a second received signal of a second wireless transmission by the transmitting device that is a retransmission of the wireless signal also received at the receiving device;
determining a mixed channel estimate based on the first received signal and the second received signal;
determining, based on the mixed channel estimate, an equalization of distortion of propagation of the wireless signal between the transmitting device and the receiving device; and
generating an equalized signal based on the determined signal equalization, wherein the equalized signal is an estimate of the wireless signal as transmitted by the transmitting device.

10. The method of claim 9, wherein determining the mixed channel estimate includes:
determining a first channel estimate based on a first training signal of the first received signal;
determining a second channel estimate based on a second training signal of the second received signal; and
determining the mixed channel estimate based on the first channel estimate and the second channel estimate; and
determining the equalization based on the mixed channel estimate.

11. The method of claim 10, wherein determining the mixed channel estimate is in response to a correlation between the first channel estimate and the second channel estimate being within a particular threshold of each other.

12. The method of claim 10, wherein determining the mixed channel estimate includes averaging the first channel estimate and the second channel estimate.

13. The method of claim 10, wherein:
determining the mixed channel estimate based on the first channel estimate and the second channel estimate includes combining the first channel estimate and the second channel estimate such that the mixed channel estimate is configured as if the first received signal and the second received signal were received at the same time by different antennas; and
wherein generating the equalized signal includes:
combining the first received signal and the second received signal to obtain a combined received signal that is configured as if the first received signal and the second received signal were received at the same time by the different antennas; and
performing the equalization, using the mixed channel estimate, with respect to the combined received signal to generate the equalized signal.

14. The method of claim 13, wherein:
combining the first channel estimate and the second channel estimate includes concatenating, to obtain a combined channel matrix, a first channel matrix that indicates the first channel estimate with a second channel matrix that indicates the second channel estimate; and
combining the first received signal and the second received signal includes concatenating, to obtain a combined signal vector, a first signal vector that indicates the first received signal and a second signal vector that indicates the second received signal; and
performing the equalization includes applying the combined channel matrix to the combined signal matrix.

15. The method of claim 9, wherein determining the mixed channel estimate includes determining an average channel estimate based on an average of a first training signal of the first received signal and a second training signal of the second received signal.

16. A system comprising:
hardware configured to perform operations, the operations comprising:
obtaining a first received signal of a first wireless transmission by a transmitting device of a wireless signal received at a receiving device;
obtaining a second received signal of a second wireless transmission by the transmitting device that is a retransmission of the wireless signal also received at the receiving device;
determining a channel estimate based on one or more of the first received signal or the second received signal;
determining, based on the channel estimate, an equalization of distortion of propagation of the wireless signal between the transmitting device and the receiving device; and
generating an equalized signal based on the determined signal equalization, wherein the equalized signal is an estimate of the wireless signal as transmitted by the transmitting device.

17. The system of claim 16, wherein determining the channel estimate includes:
determining a first channel estimate based on a first training signal of the first received signal;
determining a second channel estimate based on a second training signal of the second received signal; and
determining the channel estimate based on the first channel estimate and the second channel estimate.

18. The system of claim 17, wherein determining the channel estimate includes averaging the first channel estimate and the second channel estimate.

19. The system of claim 17, wherein:
determining the channel estimate based on the first channel estimate and the second channel estimate includes combining the first channel estimate and the second channel estimate such that the channel estimate is configured as if the first received signal and the second received signal were received at the same time by different antennas; and
wherein generating the equalized signal includes:
combining the first received signal and the second received signal to obtain a combined received signal that is configured as if the first received signal and the second received signal were received at the same time by the different antennas; and
performing the equalization, using the channel estimate, with respect to the combined received signal to generate the equalized signal.

20. The system of claim 16, wherein:
determining the equalization includes:
determining a preliminary equalization of the equalization based on the channel estimate;
determining error correction information associated with the first received signal based on data decoded from the first received signal; and determining an enhanced equalization based on the determined error correction information; and wherein determining the equalized signal includes:
performing the preliminary equalization with respect to the second received signal to generate a preliminary equalized signal; and
modifying the preliminary equalized signal based on the enhanced equalization to generate the equalized signal.

* * * * *